(12) United States Patent
Manion et al.

(10) Patent No.: US 8,260,857 B2
(45) Date of Patent: Sep. 4, 2012

(54) ONE TO MANY DATA PROJECTION SYSTEM AND METHOD

(75) Inventors: Todd R. Manion, Redmond, WA (US); Rohit Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1873 days.

(21) Appl. No.: 10/692,384

(22) Filed: Oct. 23, 2003

(65) Prior Publication Data

US 2005/0102356 A1    May 12, 2005

(51) Int. Cl.
*G06F 15/16* (2006.01)

(52) U.S. Cl. ............ 709/205; 353/28; 353/71; 719/328

(58) Field of Classification Search .................. 709/203, 709/217, 227, 204, 205, 219, 224, 229; 707/770
See application file for complete search history.

(56) References Cited

U.S. PATENT DOCUMENTS

| | | | |
|---|---|---|---|
| 5,835,715 A | 11/1998 | Dahl | |
| 5,944,794 A | 8/1999 | Okamoto et al. | |
| 5,987,376 A | 11/1999 | Olson et al. | |
| 6,065,057 A | 5/2000 | Rosen et al. | |
| 6,088,451 A | 7/2000 | He et al. | |
| 6,094,189 A | 7/2000 | Quillen et al. | |
| 6,161,137 A * | 12/2000 | Ogdon et al. | 709/224 |
| 6,249,281 B1 | 6/2001 | Chen et al. | |
| 6,349,337 B1 | 2/2002 | Parsons et al. | |
| 6,411,993 B1 | 6/2002 | Reynolds et al. | |
| 6,470,375 B1 | 10/2002 | Whitner et al. | |
| 6,560,637 B1 | 5/2003 | Dunlap et al. | |
| 6,636,888 B1 | 10/2003 | Bookspan et al. | |
| 6,675,261 B2 | 1/2004 | Shandony | |
| 6,725,219 B2 * | 4/2004 | Nelson et al. | 707/770 |
| 6,823,327 B1 | 11/2004 | Klug et al. | |
| 6,904,451 B1 | 6/2005 | Orfitelli et al. | |
| 6,917,964 B2 * | 7/2005 | Kita et al. | 709/204 |
| 6,943,752 B2 | 9/2005 | Masumoto et al. | |
| 6,981,043 B2 | 12/2005 | Botz et al. | |
| 7,027,035 B2 | 4/2006 | Youden | |
| 7,140,731 B2 | 11/2006 | Olson et al. | |
| 2002/0029256 A1 | 3/2002 | Zintel et al. | |
| 2002/0059415 A1 | 5/2002 | Chang et al. | |

(Continued)

FOREIGN PATENT DOCUMENTS

JP          11031059         2/1999

(Continued)

OTHER PUBLICATIONS

UPnP Forum, Documents, Universal Plug and Play Documents retrieved from http://www.upunp.org/resources.documents.asp on Apr. 17, 2002.

(Continued)

*Primary Examiner* — Dustin Nguyen
(74) *Attorney, Agent, or Firm* — Microsoft Corporation

(57) ABSTRACT

The system and method of information or presentation projection allows a user to present information to single or multiple screens without need of additional cables. Universal Plug and Play (UPnP) is used to advertise, find, and control the display devices. A reverse Terminal Service (TS) session is used to connect the display to the user's machine. Attendance at and receipt of the presentation is addressed from both a presenter side and from an attendee side through a subscription model. This subscription model is facilitated and security of the presentation is addressed through the use meeting invitations. These invitations are generated by the presenter, and may be requested by the attendees.

16 Claims, 8 Drawing Sheets

U.S. PATENT DOCUMENTS

| | | |
|---|---|---|
| 2002/0108108 A1 | 8/2002 | Akaiwa et al. |
| 2002/0112058 A1* | 8/2002 | Weisman et al. ............. 709/227 |
| 2002/0133330 A1 | 9/2002 | Loisey et al. |
| 2002/0143989 A1 | 10/2002 | Huitema et al. |
| 2002/0147791 A1* | 10/2002 | Choi ............................. 709/217 |
| 2002/0188657 A1 | 12/2002 | Traversat et al. |
| 2002/0196378 A1 | 12/2002 | Slobodin et al. |
| 2003/0013438 A1 | 1/2003 | Darby |
| 2003/0023681 A1 | 1/2003 | Brown et al. |
| 2003/0028637 A1 | 2/2003 | Gross |
| 2003/0055892 A1 | 3/2003 | Huitema et al. |
| 2003/0056093 A1 | 3/2003 | Huitema et al. |
| 2003/0056094 A1 | 3/2003 | Huitema et al. |
| 2003/0061371 A1 | 3/2003 | Deshpande |
| 2003/0078840 A1 | 4/2003 | Strunk et al. |
| 2003/0088681 A1* | 5/2003 | Liscano et al. ................ 709/229 |
| 2003/0098819 A1 | 5/2003 | Sukthankar et al. |
| 2003/0117532 A1 | 6/2003 | Karasawa et al. |
| 2003/0117587 A1 | 6/2003 | Olson et al. |
| 2003/0126211 A1* | 7/2003 | Anttila et al. ................. 709/205 |
| 2003/0191816 A1* | 10/2003 | Landress et al. ............. 709/219 |
| 2003/0191836 A1 | 10/2003 | Murtha et al. |
| 2003/0196060 A1 | 10/2003 | Miller |
| 2003/0225621 A1 | 12/2003 | Nurcahya et al. |
| 2003/0229900 A1 | 12/2003 | Reisman |
| 2003/0236889 A1 | 12/2003 | Manion et al. |
| 2004/0064693 A1 | 4/2004 | Pabla et al. |
| 2004/0111469 A1 | 6/2004 | Manion et al. |
| 2004/0111515 A1 | 6/2004 | Manion et al. |
| 2004/0128344 A1* | 7/2004 | Trossen ........................ 709/203 |
| 2004/0133640 A1 | 7/2004 | Yeager et al. |
| 2004/0148333 A1 | 7/2004 | Manion et al. |
| 2004/0148611 A1 | 7/2004 | Manion et al. |
| 2004/0205243 A1 | 10/2004 | Hurvig et al. |
| 2004/0217948 A1 | 11/2004 | Kawasaki et al. |
| 2005/0036509 A1 | 2/2005 | Acharya et al. |
| 2005/0086300 A1 | 4/2005 | Yeager et al. |
| 2005/0091359 A1 | 4/2005 | Soin et al. |
| 2005/0102356 A1 | 5/2005 | Manion et al. |
| 2006/0147791 A1 | 7/2006 | Debe et al. |

FOREIGN PATENT DOCUMENTS

| | | |
|---|---|---|
| JP | 2000222163 A | 8/2000 |
| JP | 2001034377 A | 2/2001 |
| JP | 2001042930 | 2/2001 |
| JP | 2001325166 A | 11/2001 |
| JP | 2002064418 A | 2/2002 |
| JP | 2002094531 A | 3/2002 |
| JP | 2002099403 | 4/2002 |
| JP | 2003198994 A | 7/2003 |
| JP | 2003218877 A | 7/2003 |
| WO | 9503664 A1 | 2/1995 |
| WO | WO-2000025199 A1 | 5/2000 |
| WO | WO-2000057308 A1 | 9/2000 |
| WO | WO-200108353 A1 | 2/2001 |
| WO | 03058476 A1 | 7/2003 |
| WO | WO-2003062999 A2 | 7/2003 |
| WO | 2004043891 A1 | 5/2004 |

OTHER PUBLICATIONS

Ellison, C., et al., Simple Public Key Certificate, (Internet Draft 1999), at http://www.world.std.com/—cme/spki.txt (Aug. 6, 2001).

Rowstron et al., Storage management and caching in PAST, a large-scale, persistent peer-to-peer storage utility, at Microsoft Research, Ltd., St. George House and Rice University, 14 pages.

Druschel; P., et al., PAST: A large-scale, persistent peer-to-peer storage utility, at Rice University and Microsoft Research, 6 pages.

Ellison, C., et al., SPKI Certificate Theory, (The Internet Society 1999), at http://www.ietf.org/rfc/rfc2693.txt?number=2693 (Aug. 6, 2001).

Langley, A., The Freenet Protocol, The Free Network Project, at http://freenet.sourceforge.net/index/php?page=protocol (May 21, 2001).

Rowstron et al., SCRIBE: The design of a large-scale event notification infrastructure, at Microsoft Research, Ltd., St. George House and Rice University, 20 pages.

Microsoft Corporation; "Introduction to Windows Peer-to-Peer Networking," Published: Jan. 2003.

Dabek, F., et al.,Building Peer-to-Peer Systems With Chord, a Distributed Lookup Serivce, at MIT Laboratory for Computer Science, 6 pages, at http://pdos.lcs.mit.edu/chord.

Ellison, C., SPKI Requirements, (The Internet Society 1999), at http://www.ietf.org/rfc/rfc2692.txt?number=2692 (Aug. 6, 2001).

Red-Black Tree, National Institute of Standards and Technology, at http://www.nist.gov/dads/HTML/redblack.html (Mar. 5, 2002).

Lai, K. et al., Measuring Link Bandwidths Using a Deterministic Model of Packet Delay, at Department of Computer Science at Stanford University, 13 pages.

Erdelsky, P., The Birthday Paradox, EFG, at http://www.efgh.com/math/birthday.htm (Mar. 8, 2002).

Rowstron et al., Pastry: Scalable, distributed object location and routing for large-scale peer-to-peer systems, at Microsoft Research, Ltd., St. George House and Rice University, 20 pages.

Press Releases "Linksys Develops and Delivers first Wireless Business Application Product With the Launch of the Wireless Presentation Gateway" article retrieved from http://www.linksys.com/press/press.asp?prid-71&cyear=2002 (Apr. 29, 2002).

UPnP Forum, *Documents*, Universal Plug and Play Documents retrieved from http://www.upunp.org/resourses.documents.asp on Apr. 17, 2002.

UpnP Forum, *Welcome to the Universal Plug and Play Forum!* Retrieved from http://www.upnp.orq on Apr. 17, 2002.

Office Action for corresponding Australian application No. 2004214576 mailed Sep. 8, 2009.

Office Action for corresponding European application No. 04 019 594.3 mailed Sep. 12, 2006.

Office Action for corresponding Japanese application No. 2004-275873 mailed Aug. 10, 2010.

Office Action for corresponding Japanese application No. 2004-275873 mailed Dec. 3, 2010.

Communication cited in EP Application No. 04019594.3 dated Feb. 14, 2011.

Search Report cited in EP Application No. 04025328.8 dated Jan. 15, 2010.

Japanese Office Action cited in Japanese Application No. 2004-310059 dated Aug. 13, 2010.

Japanese Final Office Action cited in Japanese Application No. 2004-310059 dated Jan. 21, 2011.

Chinese Office Action cited in Chinese Application No. 200410088277.0 dated Apr. 29, 2010.

Chinese Office Action cited in Chinese Application No. 200410092108.4 dated Jul. 21, 2008.

Russian Notice of Allowance cited in Russian Application No. 2004131035/09 dated Jul. 21, 2010.

Russian Official Action cited in Russian Application No. 2004131029/09 dated Aug. 26, 2009.

Non-Final Office Action cited in U.S. Appl. No. 10/786,833 dated Mar. 16, 2009.

Final Office Action cited in U.S. Appl. No. 10/786,833 dated Nov. 24, 2009.

Non-Final Office Action cited in U.S. Appl. No. 101786,313 dated Oct. 2, 2007.

Final Office Action cited in U.S. Appl. No. 10/786,313 dated Apr. 3, 2008.

Advisory Action cited in U.S. Appl. No. 10/786,313 dated Jul. 9, 2008.

Non-Final Office Action cited in U.S. Appl. No. 10/786,313 dated Oct. 29, 2008.

Final Office Action cited in U.S. Appl. No. 10/786,313 dated Mar. 17, 2009.

Advisory Action cited in U.S. Appl. No. 10/786,313 dated Jun. 23, 2009.

Notice of Allowance cited in U.S. Appl. No. 10/786,313 dated Aug. 6, 2009.

Notice of Allowance cited in U.S. Appl. No. 10/786,313 dated Nov. 16, 2009.

Notice of Allowance cited in U.S. Appl. No. 10/786,313 dated Mar. 5, 2010.

"Dynamic Participation in a Computer-Based Conferencing System", Goopeel Chung, Kevin Jeffay and Hussein Abdel-Wahab, Computer Communications, Elsevier Science Publishers BV, Amsterdam, NL vol. 17 No. 1, Jan. 1994 pp. 7-16.

"Oracle Media Server Framework", Andrew Laursen, Jeffrey Olkin and Mark Porter, Digest of papers of the Computer Society Computer Conference (Spring) Compcon Technologies for the Information Superhighway, San Francisco, Mar. 5-9, 1995, Los Alamitos, IEEE Comp. Soc. Press, US, vol. Conf. 40, pp. 203-208.

"Meeting Capture in a Media Enriched Conference Room", Patrick Chiu, Ashutosh Kapuskar and Lynn Wilcox, Cooperative Buildings: Integrating Information, Organizations and Architecture; Second International Workshop, CoBuild '99; Proceedings, Pittsburgh, Pennsylvania, Oct. 1-2, 1999, pp. 79-88.

"NoteLook: Taking Notes in Meetings with Digital Video and Ink", Patrick Chiu, Ashutosh Kapuskar, Sarah Reitmeier and Lynn Wilcox, Proceedings ADM Multimedia, Orlando, Florida, Oct. 30-Nov. 5, 1999, pp. 149-158.

"Group Interactive Learning with Group Process Support Technology", Catherine Jones, Michael Connelly, Anthony Gear and Martin Read, British Journal of Educational Technology, vol. 32, No. 5, 2001, pp. 571-586.

"Tele-Graffiti: A Camera-Projector Based Remote Sketching System with Hand-Based User Interface and Automatic Session Summarization", Naoya Takao, Jianbo Shi and Simon Baker, International Journal of Computer Vision, 2003, 53(2), pp. 115-133.

"Evaluating Windows NT Terminal Server Performance", Alexander Ya-Li Wong and Margo I. Seltzer, Proceedings of the 3rd USENIX Windows NT Symposium, Seattle, Washington, Jul. 12-13, 1999.

EP Communication cited in related EP Application No. 03013281.5 dated Jul. 17, 2007.

EP Communication cited in related EP Application No. 04025328.8 dated Sep. 2, 2010.

EP Communication cited in related EP Application No. 03013281.5 dated Oct. 17, 2007.

Japanese Office Action cited in related Japanese Application No. 2003-181888 dated Aug. 8, 2008.

Japanese Office Action cited in related Japanese Application No. 2003-181888 dated Jan. 23, 2009.

Japanese Office Action cited in related Japanese Application No. 2003-181888 dated Jul. 17, 2009.

Chinese Office Action cited in related Chinese Application No. 200410092108.4 dated May 25, 2007.

Chinese Notice of Allowance cited in related Chinese Application No. 200410092108.4 dated Sep. 25, 2009.

Australian Office Action cited in related Australian Application No. 2004214576 dated Feb. 9, 2010.

Australian Office Action cited in related Australian Application No. 2004214576 dated Apr. 22, 2010.

Australian Notice of Acceptance cited in related Australian Application No. 2004214576, dated Jun. 25, 2010.

Australian Office Action cited in related Australian Application No. 2004218616 dated Aug. 29, 2008.

Australian Office Action cited in related Australian Application No. 2004218616 dated Jun. 5, 2009.

Australian Office Action cited in related Australian Application No. 2004218616 dated Dec. 23, 2009.

Australian Notice of Allowance cited in related Australian Application No. 20048616 dated Mar. 22, 2010.

Russian Office Action cited in related Russian Application No. 2004131035/09 dated Apr. 23, 2009.

Russian Office Action cited in related Russian Application No. 2004131029/09 dated Nov. 25, 2008.

Non-Final Office Action cited in related U.S. Appl. No. 10/179,431 dated Jul. 26, 2005.

Final Office Action cited in related U.S. Appl. No. 10/179,431 dated Feb. 9, 2006.

Non-Final Office Action cited in related U.S. Appl. No. 10/179,431 dated May 9, 2006.

Final Office Action cited in related U.S. Appl. No. 10/179,431 dated Nov. 1, 2006.

Non-Final Office Action cited in related U.S. Appl. No. 10/179,431 dated Jun. 14, 2007.

Final Office Action cited in related U.S. Appl. No. 10/179,431 dated Nov. 23, 2007.

Advisory Action cited in related U.S. Appl. No. 10/179,431 dated Jan. 23, 2007.

Advisory Action cited in related U.S. Appl. No. 10/179,431 dated Feb. 13, 2008.

"Personal Projectors Based on VXSEL Arrays", V. Michael Bove, Jr. and Wilfrido Sierra, Projection Displays IX, Santa Clara, Ca., Jan. 22, 2003.

"Multimedia Communication Systems, Multicast Protocol for Presentation in Wireless Lan Environment", Miyamoto Maiko, Ikeda Takashi and Okada Ken'ichi, Transactions of Information Processing Society of Japan, vol. 42, No. 12 (Abstract only).

"A PDA-based interface for a computer supported educational system", Vila, X; Riera, A; Sanchez, E; Lama, M; Moreno, D.L.; Advanced Learning Technologies, 2003, Proceedings. The 3rd IEEE International Conference on Jul. 2003 (Abstract only).

"Software solution to completely wireless presentation", Jingyuan Zhang and Min Zhang, Parallel Processing Workshops, 2001 (Abstract only).

EP Communication cited in related European Application No. 04019594.3 dated Mar. 10, 2005.

Korean Office Action cited in Korean Application No. 10-2004-70276 dated Mar. 14, 2011.

Korean Office Action cited in Korean Application No. 10-2004-84913 dated Apr. 18, 2011.

Mexican Office Action cited in Mexican Application No. PA/a/2004/010032 dated Sep. 10, 2008.

Mexican Office Action cited in Mexican Application No. PA/a/2004/010032 dated Sep. 29, 2009.

Mexican Notice of Allowance cited in Mexican Application No. PA/a/2004/010032 dated May 14, 2010.

Mexican Office Action cited in related Mexican Application No. PA/a/2004/010402 dated Sep. 8, 2009.

Mexican Notice of Allowance cited in Mexican Application No. PA/a/2004/010402 dated Nov. 25, 2009.

Microsoft in Education, Educator Tutorial Series, 1999 (Collaborating with other using NetMeeting)—12 pages.

Canadian Office Action cited in Canadian Application No. 2,482,220, dated May 22, 2012. 7 pgs.

* cited by examiner

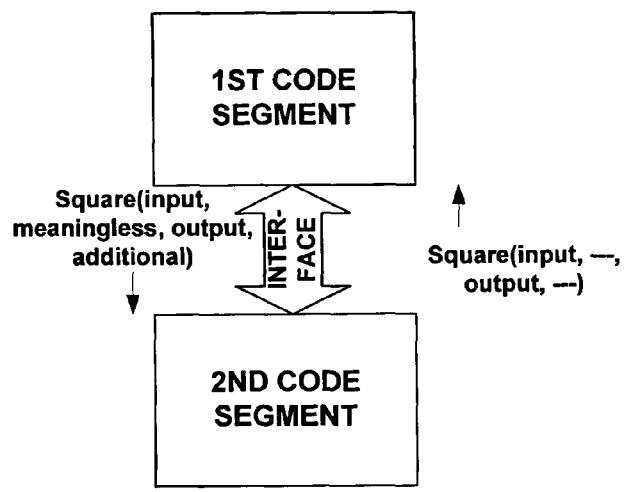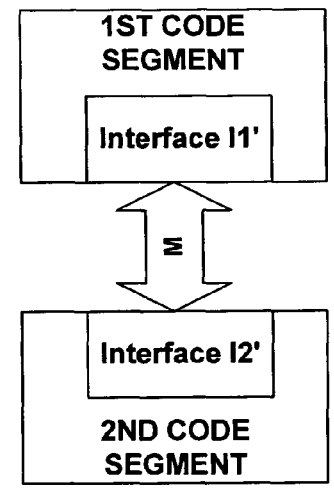
FIGURE 6
FIGURE 7
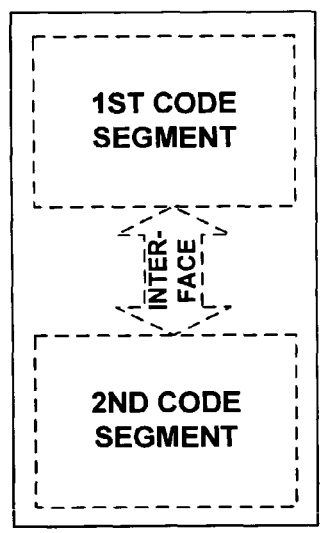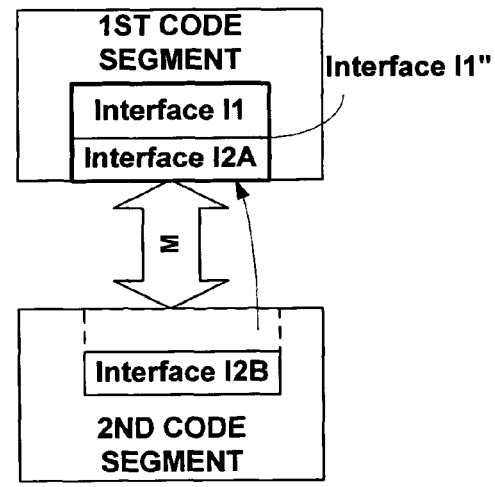
FIGURE 8
FIGURE 9

ONE TO MANY DATA PROJECTION SYSTEM AND METHOD

FIELD OF THE INVENTION

The present invention relates generally to information presentations, and more particularly to a system and method for information projection from one presenter to many attendees and projection devices.

BACKGROUND OF THE INVENTION

Despite the technological advances realized in recent years, many traditional business activities still have a prominent place in today's workplaces. One such activity is the meeting or conference. Often, such a collaborative effort will involve a presentation of material by one participant to a number of other participants. Traditional means for presenting information include projection on a screen, display on a monitor or other optically active device, or presentation in hard copy form, such as on a white board, chalkboard or easel. While each of these methods has benefits and drawbacks in terms of cost, complexity, and effectiveness, projection and display are typically best suited for rapidly changing data such as may be presented via slides or video. Additionally, projection and display are also ideal for sharing of information from the screen of a computer or other computing device, such as during a Microsoft brand PowerPoint slide presentation.

Unfortunately for projection technology users and participants, traditional mechanisms for projection and display of information from a computing device, while highly effective once initiated, have often been complex to establish, requiring the connection of cords, such as VGA cables, and the setting of various parameters. This complexity can lead to complications before and during a presentation, and often lead to delay in commencing a presentation. Additionally, such mechanisms do not allow simple and rapid transfer of control of the presentation from one speaker to another. Thus, for example, if a first speaker is using a PC to present a POWER POINT slide show and wishes to cede the floor to a second speaker, the second speaker typically must physically leave their chair and walk to a location next to the first speaker's PC, during which time there will be discontinuity, delay, and distraction for the other participants.

Another problem relates to the security of the information presented during such a meeting. Specifically, once an attendee is physically in the room, or is able to see into the room in which a presentation is give, there is no way to restrict that person's ability to view the presented information. While physical methods can be employed to prevent initial access to the physical location of a presentation, such methods do not account for security when multiple presentations are given in the same location as discussed above. That is, once one is in a presentation location, one is able to observe all presentations given in that location.

To address this concern, many seminar locations utilize a number of different, smaller presentation locations or rooms. In this way, individuals admitted to each presentation can be more carefully screened. However, while this addresses security concerns of the presenters, it often makes attendance at these presentations difficult for the attendees. These attendees now must physically move from location to location to view the desired presentations, having to pack and unpack their materials at each site. Further, attendees with physical handicaps may miss the beginning of a presentation or have to leave a presentation early in order to make the physical location move. Additional material may be missed as the attendees may enter the wrong room or be unable to find the location of a particular presentation.

There exists, therefore, a need in the art for a system and method of one to many (1:M) information projection that addresses both presenter and attendee requirements and desires, that provides security for presentations, and that allows control of the information shared during the presentation.

BRIEF SUMMARY OF THE INVENTION

The present invention provides a new and improved system and method for the display of information to many attendees. More particularly, the present invention provides a new and improved system and method for the delivery of a presentation to many attendees. Preferably, the presentation may be displayed on a projector, and/or on the display device of the many attendees. The presentation may be open, or may require security authentication be performed prior to "admitting" an attendee to view the presentation.

In a preferred embodiment of the present invention, both the presentation and the attendees conform to the Universal Plug and Play standard so that they may be discovered on the network. Connections are made through a terminal services session. From the presenter's point of view, discovery of projectors and attendees allows control over whom and what is admitted to the presentation. This may be accomplished by requiring an invitation, generated by the presenter, be used to gain allowance to the presentation. Security may also be added by requiring a password as well. The presenter may also designate a presentation as being open, and may automatically generate invitations for any attendee who requests admission to the presentation. From the attendees' point of view, they may find available presentations by performing a search for the presentation device on the network. They may then choose which presentation(s) they wish to view, and may request admission thereto. When a presenter wants to stop the presentation, it will just inform a presentation manager to stop the presentation. The presentation manager will then disconnect all the connections and cleanup any state.

In one embodiment of the present invention, application programming interfaces (APIs) are provided. These APIs include methods for viewing a presentation and methods for giving a presentation. The viewing APIs include methods to register and unregister a display device, and a method to attend a presentation. The giving a presentation APIs include methods for starting and stopping a presentation, inviting and disconnecting an attendee, filtering the presenter's screen, retrieving a list of or individual users and projectors, retrieving the projector capabilities, state, and connection list, and retrieving and setting the projector display settings and mode.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is a simplified block diagram illustrating a programming interface between two code segments having certain aspects ignored, added, or redefined, illustrating the concept of redefinition;

FIG. 7 is a simplified block diagram illustrating an alternate embodiment of a programming interface between two code segments having certain aspects ignored, added, or redefined, illustrating the concept of redefinition;

FIG. 8 is a simplified block diagram illustrating a programming interface between two code segments having some of the functionality of the two code modules merged such that the interface between them changes form, illustrating the concept of inline coding;

FIG. 9 is a simplified block diagram illustrating an alternate embodiment of a programming interface between two code segments having some of the functionality of the two code modules merged such that the interface between them changes form, illustrating the concept of inline coding;

Figure 1:
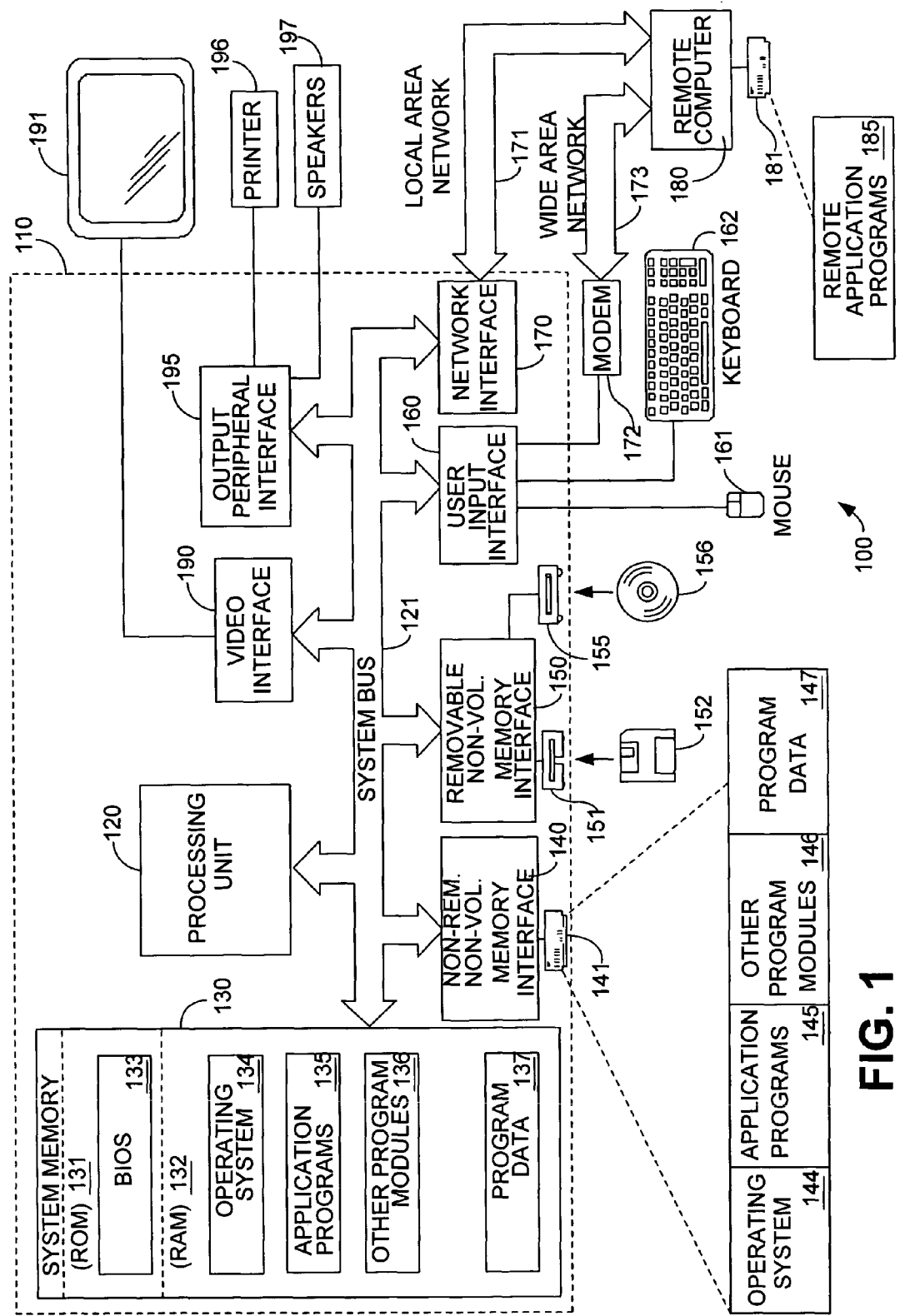
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Indeed, a programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2:
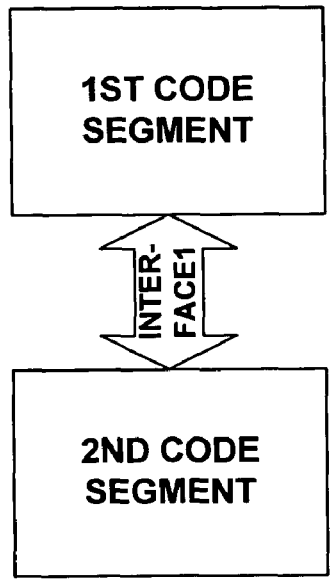
FIG. 2 is a simplified block diagram illustrating a programming interface between two code segments.
Figure 3:
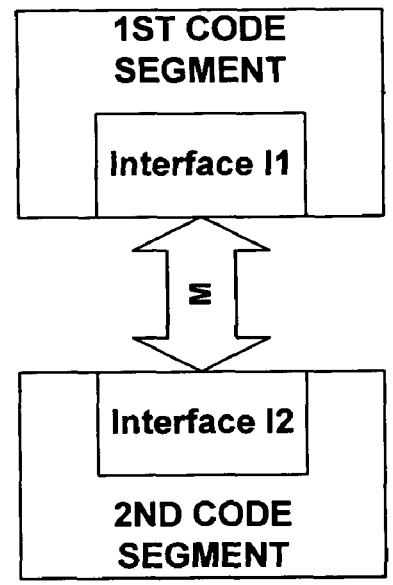
FIG. 3 is a simplified block diagram illustrating an alternate embodiment of a programming interface between two code segments.

Notionally, a programming interface may be viewed generically, as shown in FIG. 2 or FIG. 3. FIG. 2 illustrates an interface Interface1 as a conduit through which first and second code segments communicate. FIG. 3 illustrates an interface as comprising interface objects I1 and I2 (which may or may not be part of the first and second code segments), which enable first and second code segments of a system to communicate via medium M. In the view of FIG. 3, one may consider interface objects I1 and I2 as separate interfaces of the same system and one may also consider that objects I1 and I2 plus medium M comprise the interface. Although FIGS. 2 and 3 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2 and 3, but they nonetheless perform a similar function to accomplish the same overall result. We will now briefly describe some illustrative alternative implementations of a programming interface.

A. Factoring

Figure 4:
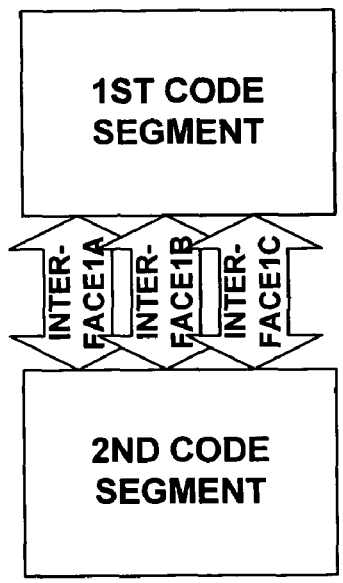
FIG. 4 is a simplified block diagram illustrating a programming interface between two code segments having communications that are broken into multiple discrete communications, illustrating the concept of factoring.
Figure 5:
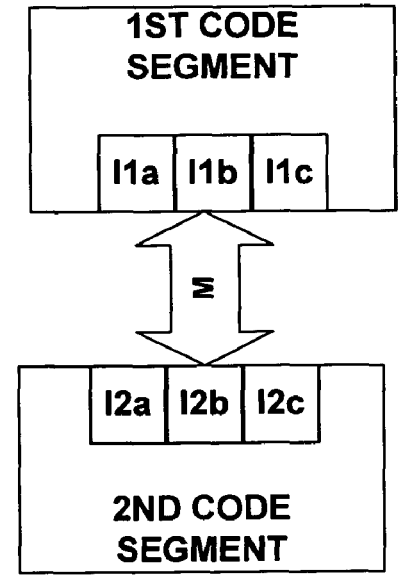
FIG. 5 is a simplified block diagram illustrating an alternate embodiment of a programming interface between two code segments having communications that are broken into multiple discrete communications, illustrating the concept of factoring.

A communication from one code segment to another may be accomplished indirectly by breaking the communication into multiple discrete communications. This is depicted schematically in FIGS. 4 and 5. As shown, some interfaces can be described in terms of divisible sets of functionality. Thus, the interface functionality of FIGS. 2 and 3 may be factored to achieve the same result, just as one may mathematically provide 24, or 2 times 2 time 3 times 2. Accordingly, as illustrated in FIG. 4, the function provided by interface Interface 1 may be subdivided to convert the communications of the interface into multiple interfaces Interface1A, Interface 1B, Interface 1C, etc. while achieving the same result. As illustrated in FIG. 5, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 4 and 5, the functional spirit of interfaces Interface1 and I1 remain the same as with FIGS. 2 and 3, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 6 and 7. For example, assume interface Interface 1 of FIG. 2 includes a function call Square(input, precision, output), a call that includes three parameters, input, precision and output, and which is issued from the $1^{st}$ Code Segment to the $2^{nd}$ Code Segment. If the middle parameter-precision is of no concern in a given scenario, as shown in FIG. 6, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 7, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 2 and 3 may be converted to the functionality of FIGS. 8 and 9, respectively. In FIG. 8, the previous $1^{st}$ and $2^{nd}$ Code Segments of FIG. 2 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 9, part (or all) of interface I2 from FIG. 3 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 3 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 10:
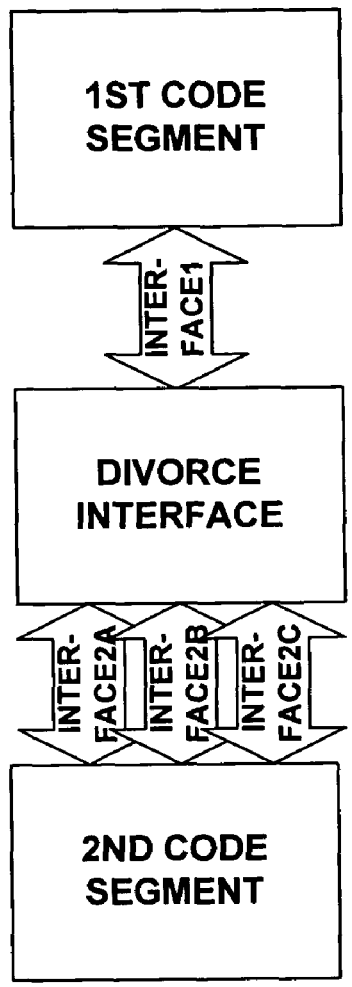
FIG. 10 is a simplified block diagram illustrating a programming interface between two code modules wherein the communication is accomplished indirectly by breaking the communication into multiple discrete communications, illustrating the concept of divorcing.
Figure 11:
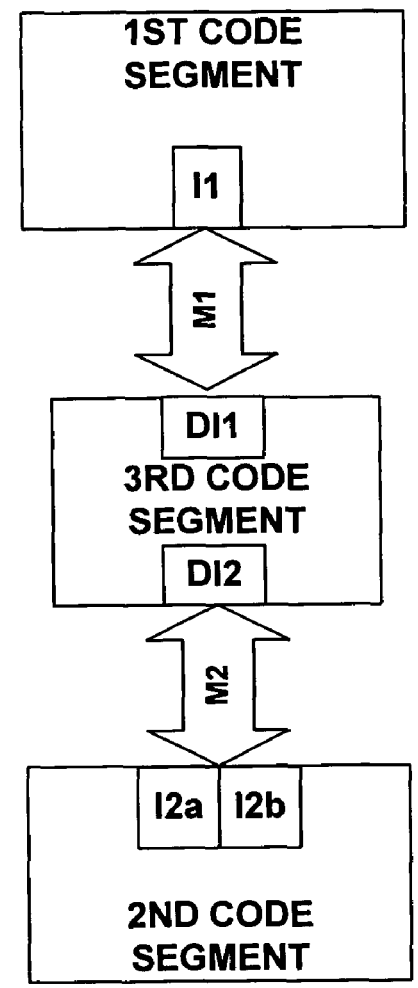
FIG. 11 is a simplified block diagram illustrating an alternate embodiment of a programming interface between two code modules wherein the communication is accomplished indirectly by breaking the communication into multiple discrete communications, illustrating the concept of divorcing.

A communication from one code segment to another may be accomplished indirectly by breaking the communication into multiple discrete communications. This is depicted schematically in FIGS. 10 and 11. As shown in FIG. 10, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 3 to a new operating system, while providing the same or similar functional result.

E. Rewriting

Figure 12:
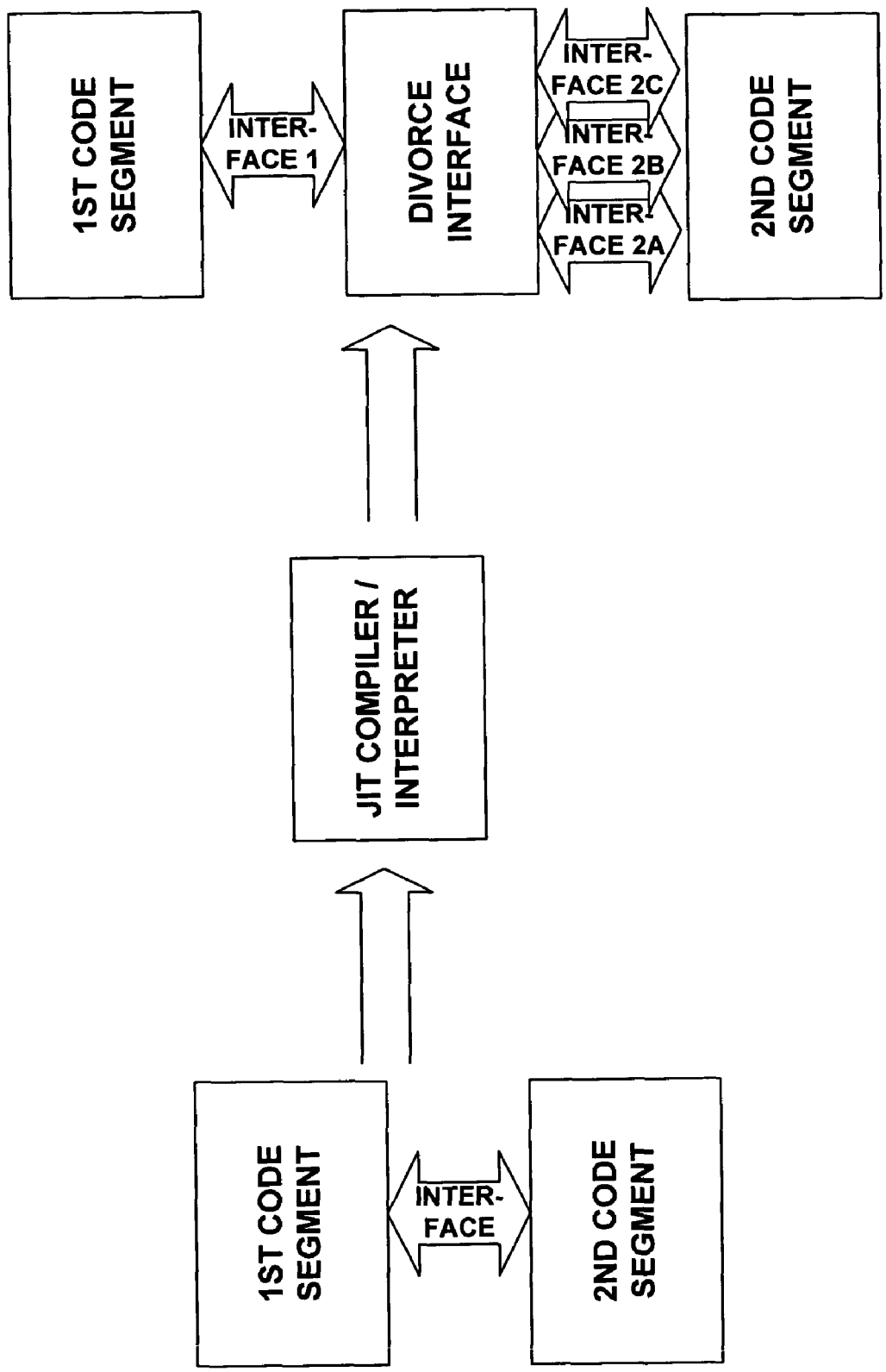
FIG. 12 is a simplified block diagram illustrating dynamically rewritten code to replace a programming interface with something else that achieves the same result, illustrating the concept of rewriting.
Figure 13:
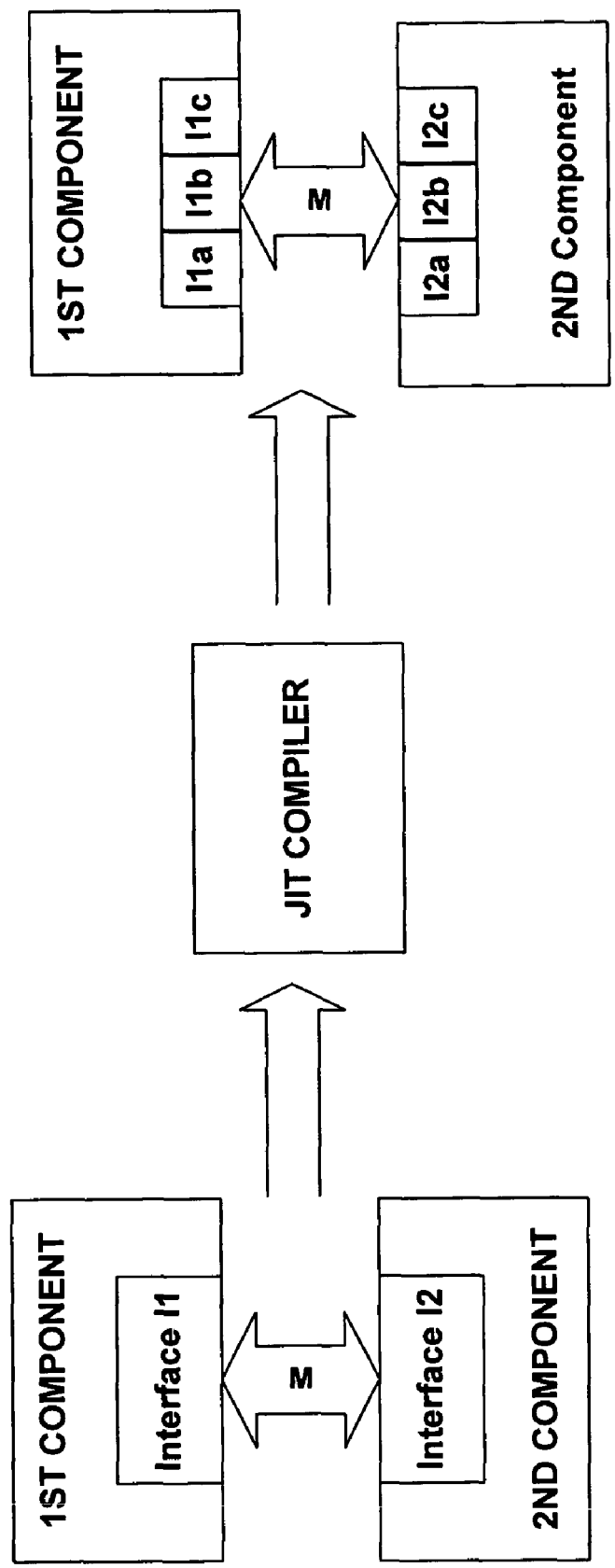
FIG. 13 is a simplified block diagram illustrating an alternate embodiment of dynamically rewritten code to replace a programming interface with something else that achieves the same result, illustrating the concept of rewriting.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12 and 13. As can be seen in FIG. 12, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 13, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2 and 3. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 14A:
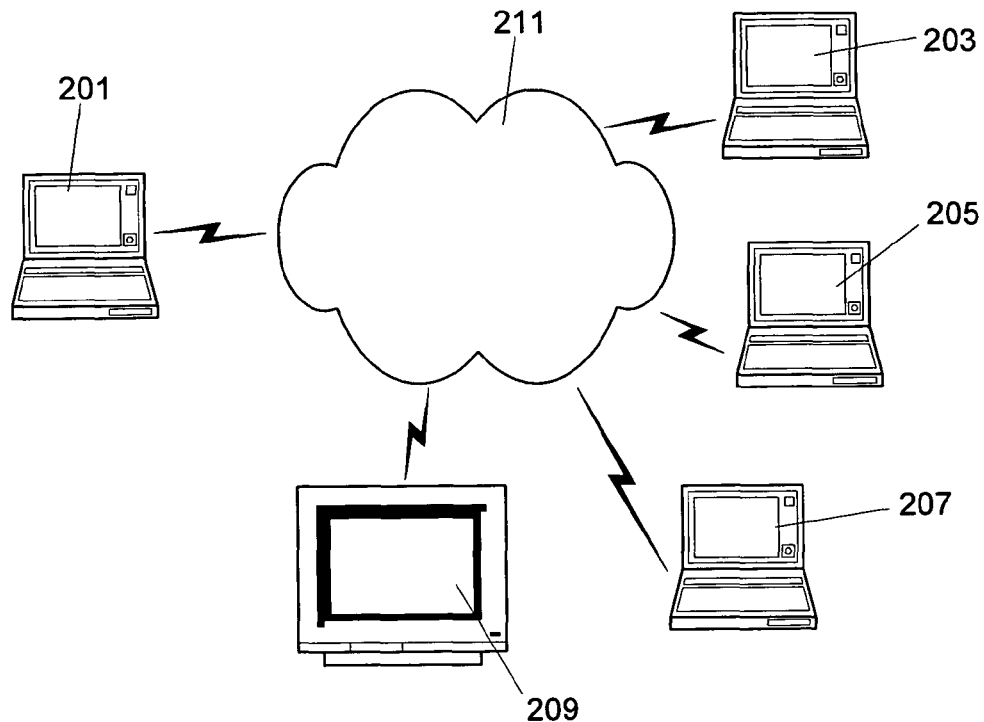
FIGS. 14A and 14B are schematic diagrams showing alternative architectures of a network system within which an embodiment of the invention may be implemented, including multiple computers comprising a projecting computer and multiple projection target computers, as well as an electronic conference room display screen or projector.

With this in mind, attention is now directed to FIG. 14A. This figure illustrates schematically a networking environment within which the present invention may be implemented. In particular, the network environment shown in the figure includes a projection device or presenter 201, which may be any computing device such as, for example, those described above in reference to FIG. 1, for projecting information to one or more projection target devices or attendees 203, 205, 207, and 209. Projection target devices or attendees 203-207 are also know as users and are illustrated as non-dedicated computing devices similar to the persenter 201. In this case, for example, the attendees (users) 201-207 may be or use, by way of example and not limitation, laptop computers, desktop computers, handheld computing devices, any other multi-purpose computing devices, or any combination of these types of devices. A user need not utilize or be a traditional computing device, and may be for example a television system. Network 211 is usable to transfer information between the attendees 203-207 and the presenter 201.

Similarly, the attendees may additionally or alternatively include a dedicated projection device such as an electronic conference room projector or display device 209 and may be referred to as a projector. As with the other attendees (users) 203-207, the attendee (projector) 209 preferably communicates with the presenter 201 (which is also a user) via network 211. Network 211 may be any type of network, but will typically comprise wireless interfaces between the presenter 201 and the network 211, and between the network 211 and the attendees (users) 203-207. Furthermore, the interface between the network 211 and the attendee (projector) 209 may desirably be either wired or wireless. For example, since the projector 209 can remain in a particular location, such as a conference room, for a long period of time, there is no significant decrease in device utility by having a wired interface from the projector 209 to the network 211. The network 211 itself will generally, although not necessarily, be a wired infrastructure such as a corporate LAN, a WAN, or other traditional wholly or partially wired network.

Figure 14B:
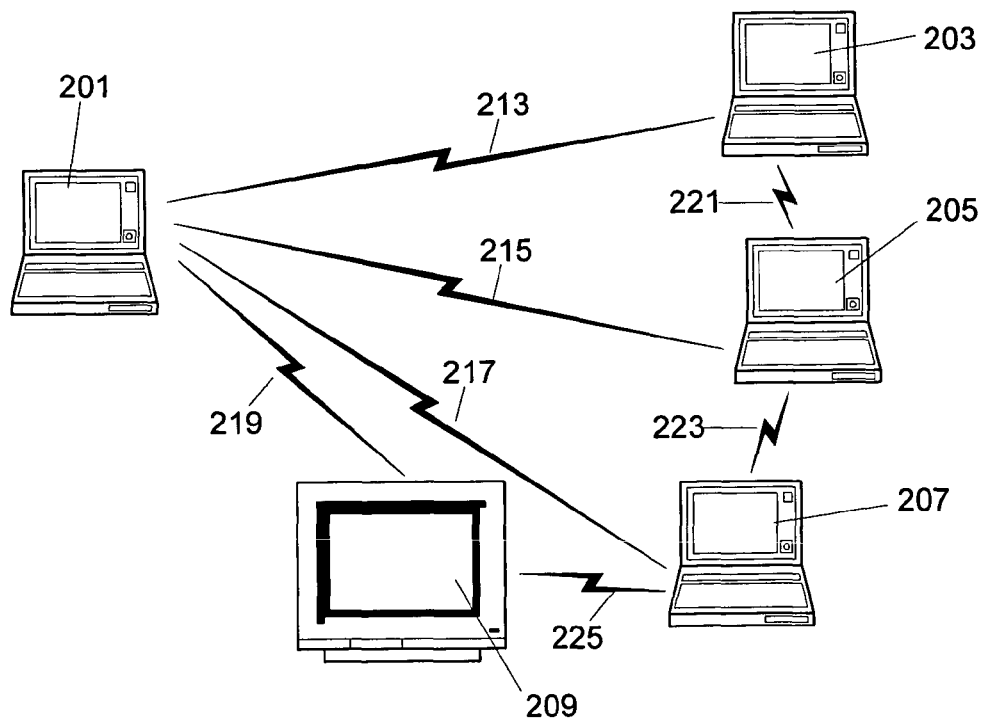

An alternative network environment is shown schematically in FIG. 14B. In particular, presenter 201 and attendees 203-209 are interconnected via an ad hoc wireless network consisting of wireless links 213-225. Note that not all of connections 213-225 are necessary since an ad hoc network does not require direct connection of every node to every other node. For example, a node may be connected to all nodes of the ad hoc network indirectly via a single connection to another node. Thus, ad hoc topologies include rings, lines, webs, hub-and-spokes, and/or other topologies as needed. Often, the physical distance of a particular device from other devices will determine to which device or devices, if any, of the ad hoc network the particular device connects directly.

The usage and interaction scenarios of the aforementioned components will be described briefly hereinafter before proceeding to a detailed description of the interaction mechanics. The presenter 201 is in the possession of a presenting individual wishing to project material of interest to receiving individuals, typically in a conference room or meeting room setting, although the inventive system is also usable in non-business settings, such as in a home environment, as well. The material of interest may be graphical, such as images or video, or textual such as in a document, chart etc., and may also include audio elements. In an embodiment of the invention, the material of interest is entirely audio information. Although the material of interest need not be computer-generated, it is preferably accessible to the presenter 201 locally or remotely in a computer-readable format. The attendees (users) 203-207 may be the laptop computers of the receiving individuals, while the attendee (projector) 209 may be a dedicated projection system, such as a conference room projector or large screen monitor or other display not typically associated physically with any one user, unlike a mobile laptop or handheld device.

The network connectivity between the attendees 203-209 typically commences as each device comes into communication range of the presenter 201 associated with the presenting user. Thus, for example, assume that the projector 209 resides permanently in a conference room. When the presenting user enters the conference room with the presenter 201, a wireless connection, either ad hoc or via a network infrastructure, is formed between the projector 209 and the presenter 201. The presenting user is then able to project material from his device 201 onto the screen of the projector 209 for the receiving individuals to observe. In this manner, the presenting user has effected a presentation without physically connecting any cables or cords, and can similarly end the presentation, or transfer its control to another presenting individual using another projection device, without disconnecting any cables or cords.

In much the same way, the presenting user can present material of interest to a number of target devices such as attendees (users) 203-207. For example, in one embodiment of the present invention the network connection between the presenter 201 and the users 203-207 may be automatically executed after automated discovery without requiring the user to locate and manipulate physical connections. In this case, the presentation of material occurs from the presenter 201 to the screens of the attendees, which may be laptop computers belonging to receiving individuals. The particular mechanics of this will be discussed more fully below, as will the various security aspects associated therewith.

Figure 15:
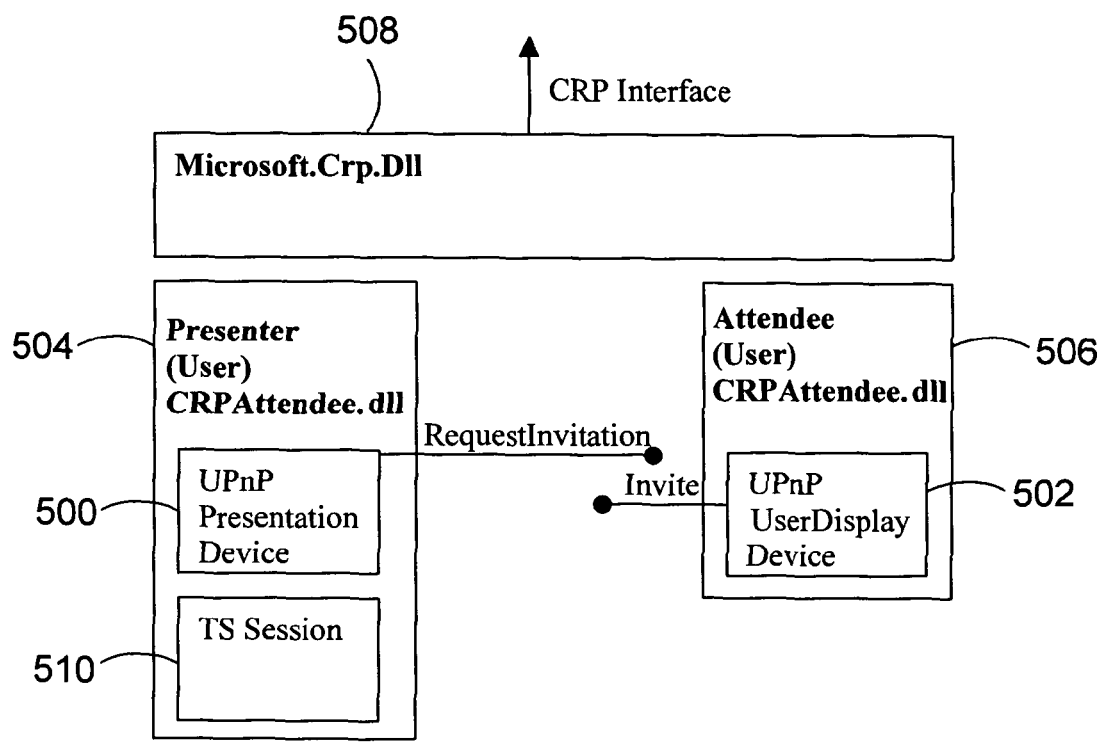
FIG. 15 is a schematic diagram illustrating in greater detail the placement and interconnectivity of projection application program components and related components in an embodiment of the invention.

FIG. 15 illustrates the different components and binaries present in the system and methods of the instant invention. The presentation device 500 is created and registered on the presenter's machine. The device is registered with UPnP, and once registered it can be discoverable via SSDP. Preferably, the device is identified by its unique device name (UDN) that is created by UPnP during the registration process. The device contains a UPnP service known as presentationservice. The user display device 502 is created and registered on the attendee's machine. This device is also registered with UPnP, and once registered it can be discovered using SSDP. This device is also identified by its UDN, and contains a UPnP service known as userdisplayservice. The three binaries present in this FIG. 15 include CRP presentation.dll 504, CRP attendee.dll 506, and Microsoft.CRP.dll 508. The CRP presentation.dll includes the presentationdevice which is the UPnP presentationdevice. Additionally, this binary provides functionality for presentationdevice registration and unregistration. These methods are used to register anu unregister the presentationdevices. Also included is the projector control functionality. These methods are used for controlling the projector, e.g. getting projector capabilities, display mode, etc. Finally, the CRP presentation.dll includes attendee control functionality. These methods are used to send invitations to the attendees.

The binary CRP attendee.dll provides functionality for the user display device, which is the UPnP device for the user display. Functionality for the user display device registration and unregistration are also provided. These methods are used to register and unregister the user display device. Finally, the CRP attendee.dll binary includes functionality for the presentation control. These methods are used to request an invitation from the presenter.

The Microsoft.CRP.dll binary is a wrapper provided over the CRP.attendee.dll and the CRP presentation.dll binaries. This exposes user friendly managed interfaces to the application. This Microsoft.CRP.dll also implements functionality to control and create terminal services sessions 510.

The conference room projector (CRP) system and methods of the present invention are dependent upon three pieces. The first is the user interface provided to the application. The second is the terminal services (TS). To project a presentation to another machine (projector or attendee) terminal services collaboration APIs are used. Terminal services allow one or more terminal service clients to connect to a terminal services server and view the session being screened by the TS server (typically the desktop). The presenter acts as a terminal services server, and attendees and projectors act as terminal services clients. Third, CRP is dependent upon UPnP. UPnP has a concept of a device, which exposes a set of actions that can be invoked by any application on the local or remote machine. UPnP also provides SSDP for discovery of UPnP devices.

In a typical setting, presentation, attendee, and projector all UPnP devices. By using SSDP a user can find the presentation devices, attendee devices, and projector devices present on the local network. For a TS client to connect to a TS server, the TS client needs an invitation generated by the TS server. To transfer the invitation from the server to the client, actions provided by the UPnP device are used. There are actions that can be invoked on the UPNP devices, for example the presentation device will have an action to request an invitation, while attendee devices will have an action that can be used to invite an attendee.

When a presenter wants to give a presentation, it will create a terminal services session 510. If there are attendees and projectors present that it wants to invite, it will create a terminal services ticket and send the invitation to the attendees and the projectors. To invite an attendee, an invite action on the attendee device is invoked. To connect to a projector, a connect action on the projector UPnP device is invoked. Once the projector and attendee have an invitation, they will provide the invitation to the terminal services client. This terminal services client will then contact the terminal services session.

As is well known in the art, a TS server is a COM component. It is used by the Microsoft.CRP.dll binary discussed above. The latest TS collaboration APIs are used for creation of the session. As with any other COM component, it must be registered to be used. Also as well known in the art, the TS client is an active X control. The Active X control has some properties associated with it like the width, height of the control, invitation and the password if required to use the invitation. The active X control must be registered to be used. The discovery mechanism will typically be SSDP to discover the devices in the CRP system. The UDNs of these devices will then be provided as input.

The state variables for these devices in an exemplary embodiment of the present invention include A_String, which is a generic string used to represent a specific or list of values, and A_Name, which is the Name or identification string of the display device.

Having introduced both the States, the Actions will now be briefly discussed. These actions include an invite method, a presenter friendly name method, and a presentation friendly name method. The GetName method returns the attendee's identification string. If the value specified is invalid, this method returns an InvalidValue error description.

In one embodiment of the present invention, a user may perform two operations, to wit the user may give a presentation or view a presentation. When giving a presentation a presenter might want to display the presentation on a projector and/or on another user's display device. When desiring to give a presentation, a presenter will perform the following steps. First, the presenter will start a presentation session. This will create a presentation device that will be discoverable by other users. It will also create a terminal services session.

The presenter may also want to discover nearby projectors and connect to those projectors. To do this the presenter performs a SSDP search for the projectors. The SSDP search will return a list of projectors. The presenter will then select one or more projectors from the list. The UDN of the projector and password if required is then provided for establishing the connection. An invitation is created for the projector based on the password using the TS session's invitation manager. The invitation will then be sent to the projector by invoking a connect action on the projector display device.

A user may also want to invite other users to view the presentation. To do that the presenter may do a search for other users. The search will provide the UDN of the user's display device. Once the UDN is discovered, the terminal services invitation manager will create an invitation for the invitee (for serving invitation only, otherwise use generic invitation). The invitation will then be sent to the invitee by invoking the invite action on the user's display device.

A presenter may also want to be notified when another user wants to attend the presentation. The action RequestInvitation on the presentation device discussed above will be invoked by the user wishing to join the presentation. In that case a callback is given to the presenter with information about the user. The presenter may then use this information to invite the user just like any other user. Alternatively, a presenter may not want to be bothered with invitations, and may simply want to allow anyone to join the presentation, without any authentication or password. In both cases, whenever the RequestInvitation action is invoked on the presenter's presentation device, the invitation will be sent immediately to the user. If the presentation is secure, then the invitation will be password protected.

When a presenter wants to stop the presentation, it will just unregister the presentation device and close the TS session.

The other operation performed by a user is viewing a presentation. In this case, the attendee may want to first discover available presentations. It can do that easily using SSDP as is well understood in the art. The attendee will receive the UDN of the presentation, and will then invoke the action RequestInvitation with relevant information on the presentation device. This is valid only in the case that the presentation allows access via such requests. If the presenter allows the attendee to view the presentation, the attendee will invoke the action Invite on the display device with the invitation. The invitation will then be given to the TS client to establish a connection. The TS client will then connect to the TS session on the presenter. In case the presenter wants to invite the attendee without being requested for invitation, the presenter will directly invoke action Invite on the display device as discussed above.

Once the connections are established, the presentation may be provided to the attendees, both users and projectors, in accordance with the methods described in co-pending application Ser. No. 10/179,431, entitled IMPROVED DATA PROJECTION SYSTEM AND METHOD, filed Jun. 25, 2002, and assigned to the assignee of the instant application, the teachings and disclosure of which are hereby incorporated herein in their entireties by reference thereto. As described in this co-pending application, the network across which the presentation may be provided comprises an 802.11 compliant wireless link, operated either in infrastructure mode or as part of an ad hoc network. Of course, those skilled in the art will recognize that other wireless networks, as well as wired networks, may be used as well. Also as described in this co-pending application, the announcement and location of users may be carried out either via the standard universal plug and play announcement mechanism whereby the Universal Plug and Play component of the attendee announces its presence and capabilities to the Universal Plug and Play component of the presenter. Alternatively, the universal Plug and Play component of the presenter may affirmatively search for and locate the Universal Plug and Play component of the attendees. Still further, this process may be reversed such that the presenter announces its presence and its presentation so that attendees can find the presentation and request admittance thereto as discussed above.

As introduced above, the Microsoft.CRP.dll binary exposes managed interfaces. The major classes provided in this CRP system include the presentation class, the attendee device class, the projector class, and the attendee class. The presentation class is the main class a presenter utilizes. To start a presentation, a presenter will have to instantiate this class. The attendee device class is used to view a presentation. That is, to view a presentation this class must be instantiated. It creates an attendee device, and provides an invitation for the presentation. The projector class represents a projector. It communicates with the projector device to get information about the projector. Finally, the attendee class represents an attendee. It provides methods and properties to give control, or to disconnect an attendee. A more detailed discussion of each of these classes will now be provided.

A overview of the Microsoft.CRP.presentation class is illustrated below in Table 1.

TABLE 1

Microsoft.CRP.Presentation
Constructors
public Presentation(String presentationFriendlyName, String presenterFriendlyName)
public Presentation(String presentationFriendlyName, String presenterFriendlyName, String password)
Properties
public Boolean InvitationOnly { get; set; }
Methods
public void Close( )
public void Dispose( )
public void ConnectProjector(Projector projector)
public void ConnectProjector(Projector projector, String password)
public void DisconnectProjector(Projector projector)
public void Invite(String attendeeUdn)
public void Invite(String attendeeUdn, String password)
public void Filter( )
Events
public AttendeeListChanged(Object sender, AttendeeListChangedEventArgs)
public InvitationRequested(Object Sender, InvitationRequestedEventArgs)
public ProjectorListChanged(Object Sender, ProjectorListChangedEventArgs)

As may be seen from this Table 1, the presentation class includes two constructors. The first, the presentation constructor, creates a new presentation. Internally, it first instantiates a terminal services session. This terminal services session is of type RDP session. Second, it opens the session. Third, this class retrieves the invitation manager from the TS session object. The invitation manager provides functionality to create the invitation. Fourth, this constructor creates a generic invitation. It then hooks into the events for the attendee connect and disconnect. Finally, this method registers a presentation device by invoking the register method in the CRP presentation.dll binary. The register method will return a handle to the presentation. A second presentation constructor works exactly like the first constructor with the only difference being, during the generation of a generic invitation, a password is provided as input.

The properties of this presentation class include the invitation only property, which controls whether the presentation is an invitation only presentation or not. If the presentation is by invitation only, then any request for invitation will be denied. If the presentation is not by invitation only, then, if no delegate is provided for the request invitation event, the caller of the request invitation is provided with the generic invitation created construction, or if a delegate is provided for the request invitation event, a callback is given to the application.

The methods exposed by this presentation class include an invite method used to invite an attendee identified by the attendee's device's UDN. This method simply invokes the invite attendee API provided by CRP presentation.dll binary. Generic invitations created during the construction of the presentation object are used. A second invite method is also provided to invite an attendee identified by the attendee device's UDN. The invitation provided to the attendee via this method is password protected. The steps invoked in this method are the creation of an invitation using the TS invitation manager. The invitation has the properties that it can only be used once, and that the invitation is identified by the attendee UDN. Because two invitations cannot have the same name, once an invitation is created for this attendee UDN, a new invitation cannot be created for the same attendee. The second step in this method is a c all to the invite attendee API provided by the CRP presentation.dll binary with the invitation created in the first step.

This presentation class also includes a connect projector method that connects the presentation to a projector. The steps involved include the creation of an invitation for the projector. This is done because TS does not distinguish between an attendee and a projector, and raises only unconnected event with a TS attendee object. The TS attendee object has three properties, the ID, name, and invitation. The ID is generated by the TS session and is unique locally. The name is just a friendly name, and the invitation is the invitation that was originally sent to an attendee. The only thing that links the invited user from the connected user is the invitation. Therefore, to separate out projectors from attendees, this method generates a separate invitation for each projector. When a connected event is fired, it is verified whether the invitation of the TS attendee just got connected was provided to a projector. If that is the case, then the projector connected even is fired, otherwise the attendee connected event is fired. The second step in this method creates an invitation having the properties that it can only be used once, and the name of the invitation is the projector's UDN. By doing this, only one invitation can be created for a projector for a given session. The third step, once the invitation is created, the ConnectProjector API exposed by the CRP presentation.dll binary is called. This API returns the session token for the projector. Fourth, the session token and the invitation for the projector are then associated with the projector object. Finally, the projector object is then added to the list of projectors. The list of projectors is an array list that contains all of the projectors that have been invited. If the projector disconnects, then it is removed from the list. Because the system can operate on projector lists from call backs, it is protected by locks. A second connect projector method is also provided, and the only difference between this method and the previous connect projector method is that the ticket is generated with the password provided as input.

This presentation class also includes a disconnect projector method to disconnect a projector. The steps involved in the disconnecting of a projector include the search for the projector and the projector list, a call to the disconnect projector API provided by the CRP presentation.dll binary to disconnect the projector, and a call to the disconnect method on the TS attendee object associated with the projector. This class also includes a close/dispose method used to dispose the presentation object. The steps involved in disposing the presentation object include unregistering the PNP presentation device by calling the unregister method exposed by the CRP presentation.dll binary. Finally, the TS session is closed.

The presentation class also provides various events. First, the attendee list changed event is signaled when the attendee list is changed. The attendee list can be changed when an attendee connects or disconnects, and this event is linked with the connected and disconnected event generated by the TS session. The event arguments contain two things, to wit the attendee object, and the change type that has happened (connected/disconnected). The event is generated when, during construction of the presentation object, the application registers for connected and disconnected events from the TS session. The TS session then generates these events when any user (attendee or projector) establishes a connection. The TS session generated event has a TS attendee object as a parameter (TS attendee has three properties, to wit ID, name, invitation as discussed earlier). Because there is a need to differentiate between a projector and attendee, separate invitations are created for projectors as discussed earlier. To figure out if the TS event is generated because of a projector, the projector list is searched based on the invitation used by the user that has connected. If the projector is present in the list, a projector list changed event is generated, otherwise an attendee list changed event is generated. This projector list changed event is signaled when a projector has connected or disconnected. As discussed above, the event is based on the TS' connected/disconnected event. If the user connected as a projector, the TS attendee object is associated with the projector object present in the projector list. Event argument projector list changed event arguments has two properties, to wit projector object (the object present in the projector list is used), and the change type that has happened (connected/disconnected).

The presentation class also has an invitation requested event that is signaled when an attendee has requested for an invitation. This event will not be signaled if the presentation is invitation only. The invitation is based on the call back that is provided by the CRP presentation.dll binary. The callback is generated when an attendee contacts the presentation device to request an invitation. The invitation requested events arguments have the following properties. First, the friendly name of the attendee requesting the invitation, and second the UDN of the attendee's device. If an application is listening for this event, and decides to provide an invitation to the attendee that requested the invitation, it should call the presentation invite with the UDN provided in the invitation requested event args. It is important to understand the security implications here. The UDN of the attendee is not trusted. As such, it is not desirable to invoke the action on the attendee device identified by the UDN unless explicitly authorized by the user. Therefore, if no one is listening for this event, the generic invitation is returned immediately instead of by invoking the action invite on the attendee device identified by this UDN. If, however, an application is listening for this event, the event is raised and an empty invitation is returned.

An overview of the Microsoft.CRP.projector class is illustrated in Table 2 below.

TABLE 2

Microsoft.CRP.Projector
Constructors
public Projector(String projectorUdn);
Properties
public String Capabilities{ get; }
public String DisplaySettings {get; set;}
public int State {get;}
Methods
public void Close( );
public void Dispose( );
public String ToString( );

As may be seen from the preceding Table 2, this projector class includes a single constructor. This projector constructor creates a projector object with only the UDN set. The properties of this class include the capabilities, display settings, and state. The capabilities method retrieves the capabilities of the projector. This method is basically a wrapper around the GetCapabilities API exposed by the CRP presentation.dll binary. The DisplaySettings method gets or sets the DisplaySettings of the projector. The get and set are basically wrappers around the GetDisplay settings and the SetDisplay settings methods exposed by the CRP presentation.dll binary. The display settings can be get/set only if the presentation is connected to the projector. The state method gets the state of the projector. This method is basically a wrapper around the GetState API exposed by the CRP presentation.dll binary. The methods exposed by this class are the close/dispose method, and the ToString method. The close/dispose methods are used to dispose the projector object. The only major operation performed by this object is to call disconnect on the TS attendee object to make sure that the projector is disconnected. The ToString method returns the friendly name of the projector.

The Microsoft.CRP.attendee device class is illustrated in Table 3 below.

TABLE 3

Microsoft.CRP.AttendeeDevice
Constructors
public AttendeeDevice(String attendeeUdn);
Methods
public void Close( );
public void Dispose( );
public String RequestInvitation(String presentationUdn);
Events
public InvitationAvailable(Object sender, InvitationAvailableEventArgs args);

As may be seen from this Table 3, this class includes a single constructor. The attendee device constructor creates an attendee device object. To view a presentation this object must be created. The constructor makes a call to the register API provided by the CRP attendee.dll binary. The register API registers a UpnP device for an attendee. The methods exposed by this class include the close/dispose method, and the RequestInvitation method. The close/dispose methods are used to dispose the attendee object. The only major operation performed by this object is to call the unregister method exposed by the CRP attendee.dll binary to unregister the UPnP device. The RequestInvitation method is used to request an invitation from a presenter provided the presentation UDN. This method basically calls the RequestInvitation API exposed by the CRP attendee.dll binary. The presenter may provide the invitation immediately, or it may call the invite API on the attendee device. If the presenter provides the invitation immediately, then this method returns the invitation, otherwise this method returns string.empty. The single event provided for this class is the invitation available event. This event is signaled when a presenter invites the attendee. Information available in the invitation available event args class include the invitation itself, the presentation friendly name, and the presenter friendly name. If the attendee wishes to use the invitation, it should provide the invitation to the TS active X control and call connect on the control. The control will then establish a TS session to the server.

An overview of the Microsoft.CRP.Attendee class is illustrated in Table 4 below.

TABLE 4

Microsoft.CRP.Attendee
Properties
public String Name {get;}
public ControlLevel ControlLevel { get; set; }
Methods
public void Disconnect( );
public String ToString( );

The properties of this class include name and control level. The name method returns the friendly name of the attendee. The control level method gets/sets the control level of the attendee. The levels of control that an attendee can have include interactive (i.e. the attendee can control the mouse pointer of the presenter), and view (the attendee can only view the presentation). This class also exposes a Disconnect and ToString method. The Disconnect method disconnects an attendee, while the ToString method returns the friendly name of the attendee.

In an exemplary embodiment of the present invention, application programming interfaces (APIs) are used for enabling the scenarios of viewing a presentation and giving presentation. These API's are typically available to the user and are not typically available to the projector. The implementation on the projector end is usually up to the projector manufacturer, although this is not a limitation on the scope of the invention. Exemplary embodiments of such APIs that are constructed in accordance with the present invention are discussed hereinafter. In a preferred embodiment, these API comprise managed code. Although it should be understood that these APIs are being presented as exemplary embodiments, not limitations on the scope of the invention.

The first set of APIs that will be discussed are those that enable the viewing of a presentation. Typical scenarios that utilize these APIs are when a user would like to either attend a presentation by explicitly discovering the presentation and joining the presentation via an appropriate invitation, or when the user would like to make itself discoverable and then get invited to attend the presentation. The APIs and callback methods that support this functionality are the Register API, the Unregister API, and the RequestInvitation API.

An exemplary embodiment of the first API to be discussed, to wit the Register API, is provided in Table 5, below.

TABLE 5

```
HRESULT
Register (
    IN     PCWSTR      pwzFriendlyName,
    IN     PFN_INVITE  pfnInvite,
    OUT    HANDLE      * phAttendee);
```

This API registers a UserDisplayDevice. Once the device is registered, it can be discovered by presenters. These presenters can then send an invitation to the user for attending the presentation. The parameters for this API are the friendly name of the display device, and the callback function invoked when a presenter invites an attendee. An output parameter is the handle that should be used later to unregister. The return values for this API are S_OK if it is successful, or E_OUTOFMEMORY if there is not enough memory to complete this operation.

An exemplary embodiment of the Unregister API is presented below in Table 6.

TABLE 6

VOID Unregister (IN HANDLE hAttendee);

This API removes the registration of a display device. Once this API has been run, all active sessions will be terminated and the user will not be discoverable by other attendees or presenters. It requires the handle returned from the Register function as a parameter, and does not provide any return values in this embodiment.

An exemplary embodiment of the RequestInvitation API is presented below in Table 7.

TABLE 7

```
HRESULT
RequestInvitation (
    IN     HANDLE  hAttendee,
    IN     BSTR    bstrPresentationUdn,
    OUT    BSTR    * pbstrInvitation);
```

As discussed above, in one embodiment of the present invention, the presentation is an UPnP device. When the RequestInvitation API is invoked, the UDN of the device is provided as the input. Based on this UDN, the presentation device is obtained. At the presentation device, an action RequestInvitation is then invoked with the information about the user. If the presenter decides to allow the user to attend presentation, the presenter will send back an invitation. The parameters for this API are the handle returned by the Register method, the UDN for the presentation, and, by way of output, the invitation. The presenter may decide to provide the invitation immediately. If the presenter does not provide an invitation, this will contain an empty string. This API provides an indication of success, or failure if there is insufficient memory or an invalid argument.

An exemplary embodiment of the callback method provided for the Register method discussed above, i.e. the Invite callback is presented below in Table 8.

TABLE 8

```
HRESULT
Invite (
    IN     BSTR    bstrInvitation,
    IN     BSTR    bstrPresentationName,
    IN     BSTR    bstrPresenterName);
```

This method is called when some presenter has invited a user to view the presentation. The invitation provided in the callback can then be used with the terminal services API to finally establish the connection necessary to actually view the presentation. The parameters for this callback method include the invitation provided by the presenter. This invitation can be used to join the presentation. Other parameters include the friendly name of the presentation, and the friendly name of the presenter. This callback method provides an indication of success.

The next set of APIs that will be discussed are those that are used when a user wants to give a presentation. In one embodiment of the present invention, these APIs include the Register API, the Unregister API, the InviteAttendee API, the DisconnectProjector API, the GetState API, the GetCapabilities API, the GetDisplaySettings API, and the SetDislaySettingsAPI.

Turning now to a discussion of the presentation API, an exemplary embodiment of the Register API is presented in Table 9, below.

TABLE 9

```
HRESULT
Register (
    IN     BSTR
    bstrPresentationFriendlyName,
    IN     BSTR
```

TABLE 9-continued

```
        bstrPresenterFriendlyName,
    IN    PFN_REQUEST_INVITATAION    pfnRequestInvitation,
    OUT   PHANDLE                    phPresentation);
```

This method is called when a presenter wants to start a presentation. When such a session is created using this method, the following steps are performed: The presentation device is created and registered with UPnP. As discussed above, this allows anyone to discover the presentation. The parameters for use with this method include the friendly name of the presentation, the friendly name of the presenter, and the callback function that is involved if a user requests to view the presentation. The API further provides a handle for the presentation session that is created. The API returns an indication of success or failure, either due to insufficient memory or if a parameter is invalid.

An exemplary embodiment of the Unregister API is presented below in Table 10.

TABLE 10

```
    VOID
    Unregister (
        IN    HANDLE    hPresentation);
```

This API is called when a presenter wants to unregister a presentation. When a presentation is unregistered, the device is unregistered in UPnP. The only parameter for this API in this embodiment is the presentation that is to be stopped.

An exemplary embodiment of the InviteAttendee API is presented in Table 11, below.

TABLE 11

```
    HRESULT
    InviteAttendee (
        IN    HANDLE    hPresentation,
        IN    BSTR      bstrUdn,
        IN    BSTR      bstrInvitation);
```

This API is called when a presenter wishes to invite an attendee to receive the presentation. When this method is called, the presenter retrieves the device using the UDN. Next, a call to the Invite method on the display device for the given UDN with this invitation is then made. The parameters for this method include the handle to this presentation, the UDN of the attendee's display device who is to be invited, and the invitation to be provided to the attendee. The API returns an indication of success or failure. The failures may be due to insufficient memory to complete the operation, an invalid argument, of if the handle is invalid.

An exemplary embodiment of the ConnectProjector API is provided in Table 12, below.

TABLE 12

```
HRESULT
ConnectProjector (
    IN    HANDLE    hPresentation,
    IN    BSTR      bstrUdn,
    IN    BSTR      bstrInvitation,
    OUT   BSTR      * pbstrSessionToken);
```

When this API is called the UDN of the projection is retrieved. The Invite method is then called on the projection device for the given UDN with this invitation. If the function is successfully completed, the session token is retrieved. Its parameters are the handle to the presentation, the invitation to be provided to the projector, and by way of output, the session token. The API returns an indication of success or failure. The failures may be due to insufficient memory to complete the operation, an invalid argument, of if the handle is invalid.

An exemplary embodiment of the DisconnectProjector API is provided in Table 13, below.

TABLE 13

```
HRESULT
DisconnectProjector (
    IN    HANDLE    hPresentation,
    IN    BSTR      bstrUdn,
    IN    BSTR      bstrSessionToken);
```

This API is called to terminate the connection to the specified device. The parameters for this API include the handle to the presentation. The UDN of the projector to be disconnected, and the session to be disconnected. The API returns an indication of success or failure. The failures may be due to insufficient memory to complete the operation, an invalid argument, of if the handle is invalid.

An exemplary embodiment of the GetProjectorCapabilities API is presented in Table 14, below.

TABLE 14

```
HRESULT
GetProjectorCapabilities (
    IN    BSTR      bstrUdn,
    OUT   PBSTR     * pbstrCapabilities);
```

This method is called when the presenter wants to obtain the capabilities of a projector. The capabilities of the projection are obtained by invoking the GetCapabilities method on the projection device. The presenter inputs the UDN of the projector, and the method outputs the capabilities associated with the projector. The API returns an indication of success or failure. The failures may be due to insufficient memory to complete the operation, an invalid argument, of if the handle is invalid.

An exemplary embodiment of the GetProjectorState API is presented in Table 15, below.

TABLE 15

```
HRESULT
GetProjectorState (
    IN    BSTR      bstrUdn,
    OUT   ULONG     * pState);
```

This method is called when the presenter wants to retrieve the current state of a projector. This projector state is obtained by invoking the GetState method on the projection device. The presenter inputs the UDN of the projector, and the method outputs the state of the projector. The API returns an indication of success or failure. The failures may be due to insufficient memory to complete the operation, an invalid argument, of if the handle is invalid.

An exemplary embodiment of the GetProjectorDisplaySettings API is presented in Table 16, below.

TABLE 16

```
HRESULT
GetProjectorDisplaySettings (
    IN    BSTR     bstrUdn,
    IN    BSTR     bstrSessionToken,
    OUT   PBSTR    * pbstrDisplaySettings);
```

This method is called when the presenter wants to retrieve the display settings for a projector. The projector display settings are obtained by invoking the GetProjection Settings method on the projector. The presenter inputs the UDN of the projector, the session token obtained when ConnectProjector succeeded, and the method outputs the display settings for the projector. The API returns an indication of success or failure. The failures may be due to insufficient memory to complete the operation, an invalid argument, of if the handle is invalid.

An exemplary embodiment of the SetProjectorDisplaySettings API is presented in Table 17, below.

TABLE 17

```
HRESULT
SetProjectorDisplaySettings (
    IN    BSTR     bstrUdn,
    IN    BSTR     bstrSessionToken,
    IN    BSTR     bstrDisplaySettings);
```

This method is called when the presenter wants to set the display settings for a projector. The display settings are set by making the SetDisplaySettings on the projector device. The presenter inputs the UDN of the projector, the session taken obtained when ConnectProjector succeeded, and the display settings to be set for the projector. The API returns an indication of success or failure. The failures may be due to insufficient memory to complete the operation, an invalid argument, of if the handle is invalid.

As introduced above, the StartPresentation API includes a callback function. An embodiment of the PFN_REQUEST_INVITATION callback function is presented below in Table 18.

TABLE 18

```
HRESULT
RequestInvitation (
    IN    BSTR     bstrName,
    IN    BSTR     bstrUdn,
    OUT   BSTR     * pbstrInvitation);
```

This callback function is invoked when a user has invoked the RequestInvitation method on the presentation device. The callback may return the invitation itself as an out parameter, or just return an empty string. The parameters of this method are the friendly name of the attendee requesting the invitation, the UDN of the attendee requesting the invitation, and by way of output, the invitation to be provided to the attendee. This method returns an indication of success.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-readable storage medium that does not comprise a carrier wave, the computer-readable storage medium comprising instructions that when executed perform a method of enabling a presentation from a first computing device to a plurality of second computing devices using an application program, the method comprising:

providing an application programming interface on the first computing device that registers one or more of the second computing devices with the first computing device;

providing an application programming interface on the first computing device for un-registering one or more of the second computing devices from the first computing device;

providing an application programming interface for one or more of the second computing devices to request an invitation to view the presentation from the first computing device;

providing a callback method on the first computing device, the callback method configured to communicate an acceptance to one or more of the second computing device indicating that the request for the invitation to view the presentation from the first computing device has been accepted;

providing an application programming interface on the first computing device for advertising that the presentation is available for one or more of the second computing devices;

providing an application programming interface on the first computing device for disconnecting the first computing device from providing the presentation to one or more of the second computing devices;

providing an application program interface on the first computing device for inviting one or more of the second computing device to view the presentation;

providing an application program interface on the first computing device for responding to a request from one or more of the second computing devices for the invitation to view the presentation;

if one or more of the second computing device connects to the presentation, providing the one or more connected second computing device a control level comprising:
    if a user of one or more of the second computing device is permitted to control a mouse pointer of a presenter, providing an interactive control level; and
    if the user of one or more of the second computing device is permitted to view the presentation, providing a view control level;

providing an application program interface on the first computing device for establishing communication between the first computing device and a projector;

providing an application program interface on the first computing device for disconnecting the first computing device from communicating with the projector;

providing an application program interface on the first computing device for obtaining capabilities of the projector;

providing an application program interface on the first computing device for obtaining state information of the projector;

providing an application program interface on the first computing device for obtaining display settings for the projector; and providing an application program interface on the first computing device for setting display settings on the projector.

2. The computer-readable storage medium of claim 1, providing an application programming interface on the first computing device that registers one or more of the second computing devices with the first computing device further comprising:

receiving at the first computing device a friendly name from one or more of the second computing devices;

receiving at the first computing device an invite from one or more of the second computing devices, the invite comprising a callback function invoked when the first computing device invites one or more of the second computing devices; and responding from the first computing device with a handle to one or more of the second computing devices, the handle used if one or more of the second computing devices attempt to disconnect from the first computing device at a future time.

3. The computer-readable storage medium of claim 2, providing an application programming interface on the first computing device for un-registering one or more of the second computing devices from the first computing device comprising receiving at the first computing device a second handle returned from a register function.

4. The computer-readable storage medium of claim 3, providing an application programming interface for one or more the second computing devices to request an invitation to view the presentation from the first computing device comprising:

receiving at the first computing device a UDN of the first computing device from the one or more of the second computing devices to ensure the first computing device is desired to be connected;

receiving at the first computing device a third handle from one or more of the second computing devices; and communicating the invitation from the first computing device to one or more of the second computing devices if the first computing device desires to allow one or more of the second computing devices to view the presentation.

5. The computer-readable storage medium of claim 4, providing a callback method on the first computing device comprising:

receiving at the first computing device an invitation from one or more of the second computing devices;

receiving at the first computing device a friendly presentation name for one or more of the second computing devices;

receiving at the first computing device a friendly presentation name for one or more of the second computing devices;

receiving at the first computing device a friendly name for the presenter using the first computing device; and communicating a successful connection indication if a connection is successful.

6. The computer-readable storage medium of claim 5, providing an application programming interface on the first computing device for advertising that the presentation is available for one or more of the second computing devices comprising:

on the first computing device, registering with a UPnP service comprising communicating the friendly presentation name, the friendly name of the presenter and a callback function from the one or more of second computing devices to the UPnP service; and communicating a fourth handle to one or more of the second computing devices if a presentation session is successfully created.

7. The computer-readable storage medium of claim 6, providing an application programming interface on the first computing device for disconnecting the first computing device from providing the presentation to one or more of the second computing devices comprising receiving at the first computing device a request to stop the presentation, comprising a name of the presentation to be stopped.

8. The computer-readable storage medium of claim 7, providing an application program interface on the first computing device for responding to a request from one or more of the second computing devices for the invitation to view the presentation comprising:

receiving at the first computing device the friendly name of the second computing devices;

receiving at the first computing device the UDN of the second computing devices; and communicating from the first computing device to one or more of the second computing devices the invitation.

9. The computer-readable storage medium of claim 8, providing an application program interface on the first computing device for inviting one or more of the second computing devices to view the presentation comprising:

receiving at the first computing device a fifth handle for the presentation from one or more of the second computing devices;

receiving at the first computing device the UDN of one or more of the second computing devices; and receiving at the first computing device the invitation, provided by the first computing device, from one or more of the second computing devices.

10. The computer-readable storage medium of claim 9, providing an application program interface on the first computing device for inviting one or more of the second computing devices to view the presentation comprising receiving a presentation name and a presenter name.

11. The computer-readable storage medium of claim 10, providing an application program interface on the first computing device for establishing communication between the first computing device and a projector comprising:

receiving at the first computing device a sixth handle for the presentation from one or more of the second computing devices;

receiving at the first computing device an invitation to be provided to the projector; and communicating a session token.

12. The computer-readable storage medium of claim 11, providing an application program interface on the first computing device for disconnecting the first computing device from communicating with the projector comprising:

receiving at the first computing device a seventh handle for the presentation to be disconnected;

receiving at the first computing device a UDN of the projector to be disconnected; and receiving at the first computing device a session token to be disconnected.

13. The computer-readable storage medium of claim 12, providing an application program interface on the first computing device for obtaining capabilities of the projector comprising:

receiving at the first computing device the UDN of the projector; and receiving the capabilities of the projector.

14. The computer-readable storage medium of claim 13, providing an application program interface on the first computing device for obtaining state information of the projector comprising:

receiving at the first computing device the UDN of the projector; and receiving the state information of the projector.

15. The computer-readable storage medium of claim 14, providing an application program interface on the first computing device for obtaining display settings for the projector comprising:

receiving at the first computing device the UDN of the projector;

receiving a session token for the projector; and receiving the display settings for the projector.

16. The computer-readable storage medium of claim 15, providing an application program interface on the first computing device for setting display settings on the projector comprising:

receiving at the first computing device the UDN of the projector;

receiving the session token for the projector; and receiving the display settings for the projector.

* * * * *